United States Patent
Hanna et al.

(10) Patent No.: US 7,589,150 B2
(45) Date of Patent: Sep. 15, 2009

(54) LOW MOLECULAR WEIGHT ISOTACTIC POLYPROPYLENE POLYMERS, COPOLYMERS AND DERIVATIVES AND MATERIALS PREPARED THEREWITH

(75) Inventors: Paul Hanna, Sugar Land, TX (US); Satyarayana Nistala, Sugar Land, TX (US); Leon L. Otte, Spring, TX (US); Kent Fudge, Sugar Land, TX (US); Thomas J. Clark, Sugar Land, TX (US); David D. Truong, Stafford, TX (US); John Woods, Missouri City, TX (US)

(73) Assignee: Baker Hughes Incorporated, Houston, TX (US)

( * ) Notice: Subject to any disclaimer, the term of this patent is extended or adjusted under 35 U.S.C. 154(b) by 654 days.

(21) Appl. No.: 10/433,164

(22) PCT Filed: Dec. 12, 2001

(86) PCT No.: PCT/US01/48725

§ 371 (c)(1),
(2), (4) Date: May 30, 2003

(87) PCT Pub. No.: WO02/060965

PCT Pub. Date: Aug. 8, 2002

(65) Prior Publication Data

US 2004/0059046 A1    Mar. 25, 2004

(51) Int. Cl.
*C08L 51/06*  (2006.01)
*C08G 63/91*  (2006.01)
*C08F 10/06*  (2006.01)

(52) U.S. Cl. .......................... 525/64; 525/70; 525/80; 525/86; 525/539; 525/437; 525/416; 525/333.7

(58) Field of Classification Search ............... 526/351; 430/109.1, 106.1, 107.1; 525/333.7, 64, 525/70, 539, 437, 416
See application file for complete search history.

(56) References Cited

U.S. PATENT DOCUMENTS

| | | | | |
|---|---|---|---|---|
| 4,442,243 A | * | 4/1984 | Woodhams | 523/212 |
| 4,999,403 A | * | 3/1991 | Datta et al. | 525/322 |
| 5,081,322 A | * | 1/1992 | Winter et al. | 585/9 |
| 5,698,357 A | * | 12/1997 | Inoue et al. | 430/108.6 |
| 5,700,896 A | * | 12/1997 | Dolle et al. | 526/351 |
| 5,928,825 A | * | 7/1999 | Eguchi et al. | 430/108.4 |
| 5,998,547 A | * | 12/1999 | Hohner | 525/301 |
| 6,063,880 A | | 5/2000 | Winter et al. | 526/160 |
| 6,143,846 A | * | 11/2000 | Herrmann et al. | 526/170 |
| 6,444,722 B1 | * | 9/2002 | Dang et al. | 522/157 |

FOREIGN PATENT DOCUMENTS

| | | | |
|---|---|---|---|
| DE | 40 30 399 A1 | * | 4/1992 |
| EP | 384 264 A1 | * | 8/1990 |
| EP | 571 882 A2 | * | 12/1993 |
| EP | 0 584 586 A | | 3/1994 |
| EP | 0 890 584 A | | 1/1999 |
| JP | 2-111965 | * | 4/1990 |
| WO | WO 98 37112 A | | 8/1998 |
| WO | WO 02 060965 A3 | | 1/2003 |

* cited by examiner

*Primary Examiner*—David Wu
*Assistant Examiner*—Rip A. Lee
(74) *Attorney, Agent, or Firm*—Mossman, Kumar & Tyler PC

(57) ABSTRACT

Disclosed are polypropylene homopolymers, copolymers and mono and polyfunctional polypropylene derivatives as well as methods of preparing them. These polymers are prepared in the eresence of a metallocene catalyst and are isotactic. Applications using these polymers include but are not limited to, electrophotography toners, melt facture reduction agents, and compatibilizers.

8 Claims, No Drawings

LOW MOLECULAR WEIGHT ISOTACTIC POLYPROPYLENE POLYMERS, COPOLYMERS AND DERIVATIVES AND MATERIALS PREPARED THEREWITH

BACKGROUND OF THE INVENTION

1. Field of the Invention

The present invention relates to isotactic polypropylene polymers, copolymers and derivatives thereof.

2. Background of the Art

It is known to prepare polyolefin polymers for many applications. For example, U.S. Pat. No. 5,707,722 to Akimoto, et al., discloses preparing a toner composed of a resin, a colorant, and a releasing agent wherein the releasing agent is a polyolefine (sic.) polymer synthesized in the presence of a metallocene catalyst. U.S. Pat. No. 5,604,573 to Endo, et al., discloses preparing a developing apparatus for developing an electrostatic image using a resin that can be an isotactic polypropylene metallocene polymerization polymer.

Use of polyolefin polymers in, for example, toners as lubricants is reported in several patents. U.S. Pat. No. 6,063,536 to Ikeyama, et al., claims a toner including a propylene-based copolymer wax wherein the propylene-based copolymer has a weight average molecular weight determined by gel permeation chromatography of from 3,000 to 50,000, a melting point determined by differential scanning calorimetry of from 120° C. to 140° C., and a propylene content of at least 90% by mole of propylene. U.S. Pat. No. 6,052,940 to Fukuzawa, et al., claims a toner for electrophotography, the toner at least containing a coloring agent, a binder resin, a charge control agent, and a functioning agent, wherein a low molecular weight polyolefin wax comprising co-polymers of alpha olefins with cycloolefins obtained by using a metallocene type polymerization catalyst is the functioning agent. U.S. Pat. No. 5,677,409 to Inoue, et al., claims a syndiotactic polypropylene wax having a syndiotactic pentad fraction of at least 0.7, a melting point in a range of 120-170° C. as measured by a differential scanning calorimeter.

SUMMARY OF THE INVENTION

In one aspect, the present invention is an isotactic polypropylene homopolymer comprising a homopolymer prepared by polymerizing propylene in the presence of a metallocene catalyst at a temperature of from about 30 to about 120 degrees centigrade under reaction conditions sufficient to polymerize propylene to produce a homopolymer having: (a) an isotacticity index of from about 60 to about 95% isotactic pentads; (b) a number average molecular weight of from about 300 to about 10,000 daltons; (c) a weight average molecular weight of from about 600 to about 20,000 daltons; (d) a melting point range of from about 50 to about 120 degrees centigrade; and (e) a polydispersity of from about 1 to about 2. These compounds hereinafter referred to as the isotactic polypropylene homopolymers of the present invention.

In another aspect, the present invention is an isotactic polypropylene copolymer comprising a copolymer prepared by polymerizing propylene monomer and at least one co-monomer in the presence of a metallocene catalyst at a temperature of from about 30 to about 120 degrees centigrade under reaction conditions sufficient to polymerize propylene to produce a copolymer having: (a) an isotacticity index of from about 60 to about 95% isotactic pentads; (b) a number average molecular weight of from about 300 to about 10,000 daltons; (c) a weight average molecular weight of from about 600 to about 20,000 daltons; and (d) a melting point range of from about 50 to about 120 degrees centigrade, wherein the copolymer is prepared with from 0.1 to 50 mole percent comonomers. These compounds hereinafter referred to as the isotactic polypropylene copolymers of the present invention.

In yet another aspect, the present invention is an isotactic polypropylene derivative comprising the reaction product of admixing: (a) an isotactic polypropylene homopolymer prepared by a process including polymerizing propylene in the presence of a metallocene catalyst at a temperature of from about 30 to about 120 degrees centigrade under reaction conditions sufficient to polymerize propylene; (b) an isotactic copolymer prepared by a process including polymerizing propylene and from 0.1 to 50 mole percent of at least one co-monomer in the presence of a metallocene catalyst at a temperature of from about 30 to about 120 degrees centigrade under reaction conditions sufficient to polymerize propylene; or (c) a mixture of (a) and (b); with a derivatizing agent or a series of derivatizing agents under reaction conditions sufficient to add to the isotactic polypropylene homopolymer or isotactic polypropylene copolymer or mixtures thereof, a functional group selected from the group consisting of alcohol, ester, anhydride, carboxylic acid, amine, nitrile, imine, silane, siloxane, alkane, sulfonate, aldehyde, epoxide, alcohol, organoborane, ethoxylate, propoxylate, higher alkoxylate, and halogen functional groups. These compounds hereinafter referred to as the isotactic polypropylene derivatives of the present invention.

In still another aspect, the present invention is a polymer comprising the product prepared by combining: (a) an isotactic polypropylene polymer prepared by polymerizing propylene in the presence of a metallocene catalyst at a temperature of from about 30 to about 120 degrees centigrade under reaction conditions sufficient to produce a polymer; (b) an isotactic polypropylene copolymer prepared by polymerizing propylene in the presence of a metallocene catalyst and from 0.1 to 50 mole percent of a co-monomer at a temperature of from about 30 to about 120 degrees centigrade under reaction conditions sufficient to produce a polymer; or (c) a mixture of (a) and (b) either alone or with a normal alpha olefin that is normally a liquid or a solid at room temperature with a free radical catalyst under reaction conditions sufficient to form a polymer.

Another aspect of the present invention is a toner comprising a resin, a colorant, and a lubricant wherein the lubricant is selected from the group consisting of an isotactic polypropylene homopolymer of the present invention, an isotactic polypropylene copolymer of the present invention, an isotactic polypropylene derivative of the present invention, and mixtures thereof.

In still another aspect, the present invention is a toner comprising a resin and a colorant, wherein the resin has lubricant properties and is prepared by admixing a thermoplastic resin having a primary, secondary or tertiary group reactive with active hydrogens with an isotactic polypropylene derivative of the present invention having an active hydrogen group under reaction conditions sufficient to form a toner resin having lubricant properties.

Another aspect of the present invention is an external mold release agent comprising a mold release agent selected from the group consisting of an isotactic polypropylene homopolymer of the present invention, an isotactic polypropylene copolymer of the present invention, an isotactic derivative of the present invention, and mixtures thereof.

In yet another aspect the present invention is an internal mold release agent comprising an isotactic polypropylene derivative of the present invention having functional groups selected from the group consisting of active hydrogen, amine, and ester functional groups.

Another aspect of the present invention is a compatibilizer comprising a polymer selected from the group consisting of an isotactic polypropylene homopolymer of the present invention, an isotactic polypropylene copolymer of the present invention, an isotactic polypropylene derivative of the present invention, and mixtures thereof wherein the compatibilizer functions to compatibilize two materials which would otherwise be incompatible.

In still another aspect, the present invention is an antiblocking agent comprising a polymer selected from the group consisting of an isotactic polypropylene homopolymer of the present invention, an isotactic polypropylene copolymer of the present invention, an isotactic polypropylene derivative of the present invention, and mixtures thereof wherein the antiblocking agent promotes the free flow of powders.

Another aspect of the present invention is a processing aid for polymers comprising a polymer selected from the group consisting of an isotactic polypropylene homopolymer of the present invention, an isotactic polypropylene copolymer of the present invention, an isotactic polypropylene derivative of the present invention, and mixtures thereof wherein the processing aid promotes the void, gel, and defect free production of a plastic article.

A last aspect of the preset invention is an adhesion improver for water based acrylic paints comprising an anionic dispersion of a polymer selected from the group consisting of an isotactic polypropylene homopolymer of the present invention, an isotactic polypropylene copolymer of the present invention, an isotactic polypropylene derivative of the present invention, and mixtures thereof, wherein, when added to water-based acrylic paints, the adhesion improver functions to improve adhesion of the paints to difficult to paint substrates, such as polypropylene containing substrates and thermoplastic olefin substrates.

DESCRIPTION OF THE PREFERRED EMBODIMENTS

In one aspect, the present invention is an isotactic polypropylene homopolymer prepared by polymerizing propylene in the presence of a metallocene catalyst. Metallocene catalysts are, in general, organometallic coordination compounds obtained as a potentially substituted cyclopentadienyl derivative of a transition metal or metal halide. Exemplary are dicylcopentadienyl-metals with the general formula $(C_5H_5)_2M$, dicylcopentadienyl-metal halides with the general formula $(C_5H_5)_2MX_{1-3}$, and monocylcopentadienyl-metal compounds with the general formula $(C_5H_5)_2MR_{1-3}$, where R is CO, NO, a halide group, an alkyl group, and the like, M is a metal and X is a halide. For example, catalyst # 465 which is dimethylsilylbis(1-methyl)-3-tert-butylcyclopentadienyl zirconium dichloride, from Boulder Scientific, is a preferred catalyst for use with the present invention.

For the purposes of the present invention, the metallocene catalysts which can be used with present invention include any that can be used to prepare the isotactic polypropylene homopolymers, isotactic polypropylene copolymers, isotactic polypropylene homopolymer derivatives, isotactic polypropylene copolymer derivatives, and polypropylene polyfunctional polymers of the present invention. Preferably, the catalysts are substituted ansa zirconocenes. Most preferably, the catalysts that are used with the present invention are those having the general formula:

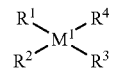

I.

Inherent in this formula are also the following formulae:

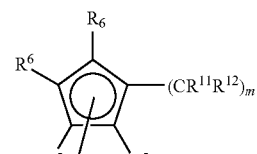

Ia and

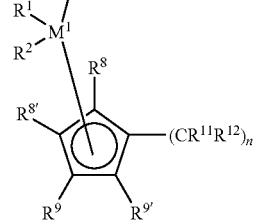

Ib

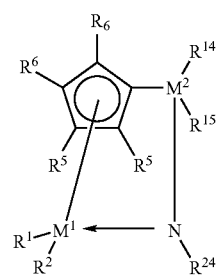

In the formulae, $M^1$ is a metal of group IVb, Vb or VIb of the Periodic Table, for example titanium, zirconium, hafnium, vanadium, niobium, tantalum, chromium, molybdenum, tungsten, preferably titanium, zirconium and hafnium.

$R^1$ and $R^2$ are identical or different and are each a hydrogen atom, a $C_1$-$C_{10}$, preferably $C_1$-$C_3$-alkyl group, in particular methyl, a $C_1$-$C_{10}$, preferably $C_1$-$C_3$-alkoxy group, a $C_6$-$C_{10}$, preferably $C_6$-$C_8$-aryl group, a $C_6$-$C_{10}$, preferably $C_6$-$C_8$-aryloxy group, a $C_2$-$C_{10}$ preferably $C_2$-$C_4$-alkenyl group, a $C_7$-$C_{40}$, preferably $C_7$-$C_{10}$-arylalkyl group, a $C_7$-$C_{40}$, preferably $C_7$-$C_{12}$-alkylaryl group, a $C_8$-$C_{40}$, preferably $C_8$-$C_{12}$-arylalkenyl group or a halogen atom, preferably chlorine.

$R^3$ and $R^4$ are identical or different and are each a monocyclic or polycyclic hydrocarbon radical that can form a sandwich structure with the central atom $M^1$. $R^3$ and $R^4$ are preferably cyclopentadienyl, indenyl, benzindenyl or fluorenyl, where the base structures can also bear additional substituents or be bridged to one another. In addition, one of the radicals $R^3$ and $R^4$ can be a substituted nitrogen atom, where $R^{24}$ is as defined for $R^{17}$ and is preferably methyl, t-butyl or cyclohexyl.

$R^5$, $R^{5'}$, $R^6$, $R^{6'}$, $R^8$, $R^{8'}$, $R^9$ and $R^{9'}$ are identical or different and are each a hydrogen atom, a halogen atom, preferably a fluorine, chlorine or bromine atom, a $C_1$-$C_{10}$, preferably $C_1$-$C_4$-alkyl group, a $C_6$-$C_{10}$, preferably $C_6$-$C_8$-aryl group, a $C_1$-$C_{10}$, preferably $C_1$-$C_3$-alkoxy group, an —$NR^{16}_2$—, —$SR^{16}$—, —$OSiR^{16}_3$, —$SiR^{16}_3$—, or —$PR^{16}_2$, radical, where $R^{16}$ is a $C_1$-$C_{10}$, preferably $C_1$-$C_3$-alkyl group or $C_6$-$C_{10}$, preferably $C_6$-$C_8$-alkyl group, or in the case of Si- or P-containing radicals is also a halogen atom, preferably a chlorine atom, or two adjacent radicals $R^5$, $R^6$, $R^8$, $R^9$ or together with the carbon atoms connecting them form a ring. Particularly preferred ligands are the substituted compounds of the base structures indenyl, benzindenyl, fluorenyl and cyclopentadienyl. $R^{13}$ is

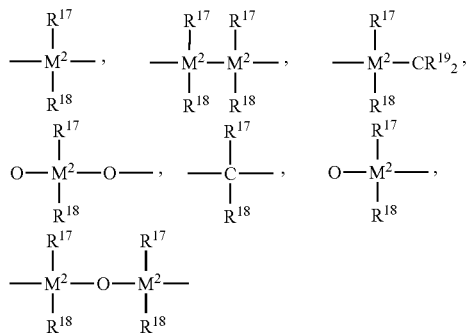

$=BR^{17}$, $=AlR^{17}$, —Ge—, —Sn—, —O—, —S—, $=SO$, $=SO_2$=$NR^{15}$, $=CO$, $=PR^{15}$ or $=P(O)R^{15}$, where $R^{17}$, $R^{18}$ and $R^{19}$ are identical or different and are each a hydrogen atom, a halogen atom, a $C_1$-$C_{30}$, preferably $C_1$-$C_4$-alkyl group, in particular a methyl group, a $C_1$-$C_{10}$-fluoroalkyl group, preferably a $CF_3$ group, a $C_6$-$C_{10}$-fluoroaryl group, preferably a pentafluorophenyl group, a $C_6$-$C_{10}$, preferably $C_6$-$C_8$-aryl group, a $C_1$-$C_{10}$, preferably $C_1$-$C_4$-alkoxy group, in particular a methoxy group, a $C_2$-$C_{10}$, preferably $C_2$-$C_4$-alkenyl group, a $C_7$-$C_{40}$, preferably $C_7$-$C_{10}$-arylalkyl group, a $C_8$-$C_{40}$, preferably $C_8$-$C_{12}$-arylalkenyl group or a $C_7$-$C_{40}$,-, preferably $C_7$-$C_{12}$-alkylaryl or $R^{17}$ and $R^{18}$ or $R^{17}$ and $R^{19}$, in each case together with the atoms connecting them, form a ring.

$M^2$ is carbon, silicon, germanium or tin, preferably silicon or germanium.

$R^{13}$ is preferably $=CR^{17}R^{18}$, $=SiR^{17}R^{18}$, $=GeR^{17}R^{18}$, —O—, —S—, $=SO$, $=PR^{17}$ or $=P(O)R^{17}$.

$R^{11}$ and $R^{12}$ are identical or different and are as defined for $R^{17}$.

The symbols m and n are identical or different and are zero, 1 or 2, preferably zero or 1, where m plus n is zero, 1 or 2, preferably zero or 1.

$R^{14}$ and $R^{15}$ are as defined for $R^{17}$ and $R^{18}$.

Examples of suitable metallocenes are the rac isomers of: ethylenebis-1-(2-methyltetrahydroindenyl)zirconiumdichloride, ethylenebis-1-(4,7-dimethyl indenyl)zirconium dichloride, ethylenebis-1-(2-methyl-4-phenylindenyl)zirconium dichloride, ethylenebis-1-(2-methyl-4,5-benzindenyl)zirconium dichloride, etbylenebis-1-(2-methyl-4,5-benzo-6,7-dihydroindenyl)zirconium dichloride, ethylenebis-1-(2-methylindenyl)zirconium dichloride, ethylenebis-1-tetrabydroindenylzirconium dichloride, and also the alkyl or aryl derivatives of each of these metallocene dichlorides.

To activate the single-center catalyst systems, suitable cocatalysts are used. Suitable cocatalysts for metallocenes of the formula I are organoaluminum compounds, in particular aluminoxanes, or aluminum-free systems such as $R^{22}{}_x$NH$_{4-x}$BR$^{23}{}_4$, $R^{22}{}_x$, PH$_{4-x}$BR$^{23}{}_4$, $R^{22}{}_3$CBR$^{23}{}_4$ or BR$^{23}{}_3$. In these formulae, x is from 1 to 4, the radicals $R^{22}$ are identical or different, preferably identical, and are $C_1$-$C_{10}$-alkyl or $C_6$-$C_{18}$-aryl or two radicals $R^{22}$ together with the atom connecting them form a ring, and the radicals $R^{23}$ are identical or different, preferably identical, and are $C_6C_{18}$-aryl which may be substituted by alkyl, haloalkyl or fluorine. In particular, $R^{22}$ is ethyl, propyl, butyl or phenyl and $R^{23}$ is phenyl, pentafluorophenyl, 3,5-bis(trifluoromethyl)phenyl, mesityl, xylyl or tolyl.

These cocatalysts are particularly suitable in combination with metallocenes of the formula I when $R^1$ and $R^2$ are each a $C_1$-$C_{10}$-alkyl group or an aryl or benzyl group, preferably a methyl group. Derivative formation to give the metallocenes of the formula I can be carried out by literature methods, for example by reaction with 5 alkylating agents such as methyllithium (cf. Organometalics 9 (1990) 1359; J. Am Chem. Soc. 95 (1973) 6263).

In addition, a third component is frequently necessary to provide protection against polar catalyst poisons. Organoaluminum compounds such as triethylaluminum, tributylaluminum and others, and also mixtures, are suitable for this purpose. Depending on the process, supported single-center catalysts can also be used. Preference is given to catalyst systems for which the residual contents of support material and cocatalyst in the product do not exceed a concentration of 100 ppm.

Another embodiment of the present invention is a polymer wherein the polymer is an isotactic polypropylene copolymer. For the purposes of the present invention, a polypropylene copolymer is a polymer prepared with propylene and at least one other monomer. Compounds useful for preparing the copolymers of the present invention are any unsaturated monomer having from 2 to 30 carbons that can undergo polymerization with propylene without giving rise to significant levels of crosslinking. Exemplary compounds include alpha olefins, hindered dienes and the like. The isotactic polypropylene copolymers of the present invention can be prepared with from 0.1 to 50 mole percent comonomers, but preferably are made with from about 1 to about 20 mole percent commoners, and most preferably are made with from about 2 to about 10 mole percent comonomers.

One significant aspect of the current invention is to produce copolymers that are relatively transparent, hard and low melting (<120° C.) when compared to typical polypropylenes (which typically have a melting point of 145° C.). Normally to obtain low melt point polypropylenes and ones with good optical properties, one must lower the molecular weight of the material. When this is done, the resultant product is typically very soft. An example of this is amorphous polypropylenes that are often semi-solids at room temperature. These products are almost never hard. (The definition of "hard" is a polymer with a penetration (typically measured by ASTM D1321) that is less than 5 dmm.) One product of this invention are copolymers that have melting points <120° C. that are still hard (<5 dmm) at 25° C.

The isotactic polypropylene homopolymers and isotactic polypropylene copolymers of the present invention as well as some of their derivatives are substantially isotactic. In an isotactic polymer, substantially all subgroups of atoms that are not a part of the backbone structure are located in the same side of the plane formed by the backbone atoms. For example, in a polypropylene homopolymer of the present invention, a substantial amount of the pendant methyl groups would be either above or below the repeating backbone chain. For the purposes of the present invention, an isotactic polymer is one in which from about 60 percent to about 99 percent of the pentads are isotactic.

The conventional co-monomers which can be used to prepare the copolymers of the present invention preferably include: alpha olefins including butene, pentene, hexene, octene, styrene, isobutylene, and the like; hindered dienes including butadiene, isoprene, chloroprene, and the like. In some applications, it can be desirable to use less conventional co-monomers that add functionality to prepare a polypropylene copolymer. Co-monomers which impart added functionality such as allyl trimethylsilane, allyl benzene, norbornylene, vinyl chloride, vinyl silanes, vinyl siloxanes, vinyl ethers, isobutylene, and the like can also be used and are preferred.

One preferred embodiment of the present invention is an isotactic polypropylene homopolymer derivative. The homopolymers and copolymers of the present invention have terminal unsaturation. For the purposes of the present invention, an isotactic polypropylene homopolymer derivative is the product of reacting the terminal unsaturation of an isotactic polypropylene homopolymer with a compound that results in the formation of a hydroxy group or other functional group on the homopolymer or copolymer. For example, one such derivative can be prepared by reacting an olefin of the present invention with hydrogen peroxide and formic acid to form an epoxide. Additionally, the epoxide can be further reacted with zinc iodide to form an aldehyde. Additionally the aldehyde can be reduced to an alcohol using sodium borohydride. Additionally the epoxide can be reduced to the alcohol in one step by reacting with hydrogen in the presence of a transition metal catalyst.

The isotactic polypropylene copolymers of the present invention can similarly be reacted with materials to form derivatives. Other materials useful for forming derivatives with the isotactic polypropylene homopolymers and isotactic polypropylene copolymers of the present invention, sometimes referred to as derivatizing agents, include reacting the olefin with hydrogen peroxide and formic acid to form an epoxide. Additionally, the epoxide can be further reacted with zinc iodide to form the aldehyde. Additionally the aldehyde can be reduced to the alcohol using sodium borohydride. Additionally the epoxide can be reduced to the alcohol in one step by reacting with hydrogen in the presence of a metal catalyst.

These derivatives of the present invention can also function as intermediates in the preparation of other derivatives. For example, a first derivative having a primary hydroxyl group can be reacted with ethylene oxide or propylene oxide in the presence of a base to form a polyether alcohol. The resultant derivative polymers will have a backbone of a polypropylene homopolymer or copolymer but will terminate with a group having a relative high reactivity including but not limited to: alcohols, amines, amide, imides, carboxylates, esters, anhydrides, and the like.

There are yet additional derivatives of isotactic polypropylene homopolymers and copolymers of the present invention. The additional derivatives are saturated polymers prepared by adding hydrogen across the terminal double bond of a polypropylene homopolymer or copolymer of the present invention. These derivatives are prepared by any method of hydrogenating a polymer known to one of ordinary skill in the art of preparing saturated polymers.

Isotactic polypropylene derivatives also include isotactic polypropylene polyfunctional polymers. For example, one such polymer is prepared by the reaction of a polypropylene homopolymer with a peracid followed by treatment with aluminum alkoxide to form an unsaturated monol. The resultant polymer has both unsaturation as well as a hydroxyl group. The polypropylene polyfunctional polymers of the present invention include polymers which have a backbone of a polypropylene homopolymer or copolymer but terminate with a group having at least two different relatively high reactivity groups including but not limited to: alcohols, amines, amide, imides, carboxylates, esters, anhydrides, and the like. For purposes of the present invention, a relatively high reactivity group is any group which is substantially more reactive than a saturated aliphatic material such as an alcohol or an amine and the like but excluding groups such as saturated alkanes, aliphatic primary ethers such as diethyl ether, and the like.

The term "polymers of the present invention" means the isotactic polypropylene homopolymers, isotactic polypropylene copolymers, and isotactic polypropylene derivatives of the present invention. These polymers are characterized, in part, by their molecular weights. Also for purposes of the present invention, molecular weight is characterized in two ways. In a first way characterizing molecular weights, a polymer is said to have a weight average molecular weight (Mw), expressed in Daltons, which is determined by GPC. In a second way of characterizing molecular weights, a polymer is said to have a number average molecular weight (Mn), also expressed in Daltons, which is also determined by GPC.

The polymers of the present invention preferably have a polydispersity of from about 1.2 to about 3.0. The term "polydispersity" refers to the value obtained by dividing a polymer's weight average molecular weight by its number average molecular weight, or stated another way, polydispersity equals Mw/Mn.

The polymers of the present invention are prepared by the metallocene-catalyzed polymerization of propylene and, in the case of the copolymers, propylene and other monomers. The polymerization can be performed in any manner known to those of ordinary skill of the art to be useful for preparing such polymerizations, but preferably is done by solution or gas phase polymerization.

The isotactic polypropylene homopolymers of the present invention have a melting point range in degrees centigrade of from about 50° C. to about 120° C., preferably from about 80° C. to about 110° C., and even more preferably from about 95° C. to 105° C., when tested by differential scanning calorimetry (DSC). The comparatively narrow melting point range of polypropylene homopolymers of the present invention make these polymers particularly useful in applications such as lubricants in toners and as anti-blocking agents. The comparatively narrow melting point range of polypropylene homopolymers of the present invention make these polymers useful in applications such as lubricants in toners and as anti-blocking agents. Additionally these polymers impart additional properties useful with a broader array of applications such as compatibilizers for dissimilar polymers, additives for graphic arts and coatings (powder coatings, thermal transfer inks, printing inks, and jet inks) and the like.

The isotactic polypropylene copolymers of the present invention also have a melting point range in degrees centigrade of from about 50° C. to about 120° C., preferably from about 80° C. to about 110° C., and even more preferably from about 95° C. to 105° C., when tested by DSC. The comparatively narrow melting point range of polypropylene co-polymers of the present invention make these polymers useful in applications similar to those of the homo-polymer as noted above, such as lubricants in toners and as anti-blocking agents; however, the use of co-monomers to prepare these polymers impart additional properties (such as improved transparency) useful with a broader array of applications such as compatibilizers for dissimilar polymers, additives for graphic arts and coatings (powder coatings, thermal transfer inks, printing inks, and jet inks), and the like.

The polymers of the present invention are useful in several applications. For example, the polymers are useful as lubricants in toners, release agents for coatings and graphic arts applications, internal mold release agents, external mold release agents, anti-blocking agents, compatibilizers, dispersants, processing aids, and the like. One important use of the polymers of the present invention is in toners. Toners are used in the process sometimes referred to as photocopying, but also referred to as electrophotography, copying, and duplicating. This same process is used in large copiers and printers and small home-office printers (commonly referred to as "Laser Printers"), and the like. Toners useful with the present invention include at least a resin, a colorant and a lubricant. In electrophotography, an electromagnetic image is formed on an organophotoconductor (OPC) drum and then exposed to the toner. Toner particles align along the electromagnetic image and are then transferred to a medium, such as paper. After the image is transferred, it is then exposed to heat, pressure, or both wherein the resin, sometimes referred to as the binder resin, serves to bind the image to the paper. One of the functions of the lubricant is to prevent the toner from permanently adhering to anything inside the printer/copier other than the paper.

The polymers of the present invention can also be used in toners wherein homopolymers of polypropylenes, copolymers of polypropylenes and derivatives of homopolymers of polypropylenes and copolymers of polypropylenes are used as lubricants and release agents in the toner formulations. The polymers of the present invention can also be used in toner formulations wherein a polymer of the present invention is a resin also having lubricant properties. The polymers of th present invention can also be used in toner formulations wherein a colorant is admixed with a resin of the present inventions also having lubricant properties. Conventional binder resins can include styrene polymers, e.g., polystyrene, styrene-acrylate copolymer resins, polyester resins, and the like. The toners of the present invention include a binder resin that can be the reaction product of a conventional resin and a polypropylene polyfunctional polymer, an isotactic polypropylene homopolymer derivative or an isotactic polypropylene copolymer derivative of the present invention. Preferably, the binder resin of a toner of the present invention is the reaction product of a homopolymer derivative of an isotactic polypropylene and polyesters or styrene butadiene acrylates.

The polymers of the present invention can be used with resins. Such resins may be obtained through the polycondensation reaction of polyoxypropylene (2,2)-2,2-bis(4-hydroxyphenyl)propane, fumaric acid, octynel succinic anhydride, terephthalic acid and alcohol derivative of polypropylenes.

The toners of the present invention can be obtained through the addition of various pigments, charge control agents, magnetic powders and other optional components to the binder resin prepared with polymers of the present invention. Resins are further processes by methods known to those of ordinary skill in the art of preparing resins, for example, the melt of the resin described above is subsequently dispersed through the use of a super mixer, Danbury mixer, roll mill, kneader or extruder. Rough pulverization of the cooled melt is carried out through the use of a cutter mill, hammer mill or similar process; fine pulverization with a jet mill; or classifying with a wind power classifier.

Normally, a surface treatment of the resulting resin product with various additives is included as a finishing step of the process. Representative examples of the above mentioned binder resin includes styrene resins, styrene-acrylic copolymer resins, polyester resins, polyethylene resins, epoxy resins, silicon resins, polyamide resins, polyurethane resins and the like. Representative examples of the above mentioned pigment includes carbon black, nigrosine, aniline blue, charcoal blue, chromium yellow, ultramarine blue, dupone oil red, quinine yellow, methylene blue chloride, phtalocyanine blue, malachite green ocsalate, lamp black, rose bengal mixture thereof and the like. The ratio of the pigments is such that the corresponding image is visibly and measurably sufficient. Representative examples of the magnetic powder includes metals having strong magnetic properties, such as ferrites, magnetite, iron, cobalt, nickel, alloys thereof and compounds comprising these elements; and alloys that do not comprise strong magnetic elements but shows strong magnetic properties upon being heat treated.

The magnetic powders referenced above are dispersed within a resin with an average weight of 20 to 70 parts of magnetic powders to 100 parts of the binder resin. The two-component developer can be obtained through mixing of the toner with carriers such as ferrite, steel and iron carriers. The toner utilized in a two-component system typically contains magnetic powders that are dispersed with an average weight of 0.1 to 10 parts to 100 parts of the binder resin.

Recent developments in electrophotographic apparatuses, particularly copying machines and printers, have been devices having ever-greater performance as measured by finer printing resolution and faster throughput or printing rates. This higher level of performance by the electrophotographic devices has resulted in higher toner performance requirements. It is difficult to produce such high performance toners by conventional processes. For example, it is difficult to produce fine dispersion of resin and wax.

Toners with poorly dispersed resin and wax can result in the toner being unevenly dispersed during electophotography, thus degrading images by lowering image density. Poorly dispersed resin and wax in toners can also result in inconsistent performance, fouling of developer sleeves and carriers, as well as scratching or film build-up on photosensitive drums. It is an object of the present invention to provide a process for improving the uniformity of dispersion of a resin in a toner using internal additives such as the polypropylenes, polypropylene copolymers and derivatives thereof of the present invention.

A toner particle of the present invention contains at least a binder resin, colorant and polypropylenes as internal additives. In some embodiments, a toner according to the present invention may also contain a combination of a charge control agent and polypropylene derivatives such as alcohols, acids and maleates in the form of external additives. These polypropylene external additives can stabilize the triboelectic charge on the final toner particle and thereby improve toner performance.

By using a toner of the present invention that is in the form of particles, it is possible to have an image with well-mixed colors and with a thin image layer. The main property needed in such a toner resin to achieve above-mentioned well-mixed colors and thin image layer is a low melt viscosity at low fixing temperature. Toner particles having a low melt viscosity can be produced using a toner resin having a lower glass transition temperature (Tg). The toners of the present invention principally employ a modified styrene butadiene acrylic resin or polyester resins as a binding resin. These modified resins contains polymers formed by reacting, grafting, blending, and combinations thereof, of the polyester or SBA resin with at least one compound selected from the group comprising the polypropylenes of the present invention including their derivatives such as alcohols, acids and maleates.

The concept for powder coating is very similar to toners. A powder coating should have many of the same properties as a toner. Accordingly, these polymers of the present invention can also be used in powder coating applications.

In preparing toners and powder coatings of the present invention, it is desirable to use degassing additives to release entrapped gases during extrusion and fusion of the toners and powder coatings. Degassing agents are additives that lower the surface tension, allowing entrapped gases to escape during extrusion and fusion steps. It should be noted that if gas is unable to escape during fusing, the gas can form bubbles in the toner or powder coating. The bubbles will often break which can leave the film surface pin holed and cratered.

It is well known in the art of powder coating that low melt viscosity polymer degassing agents work better than conventional degassing agents such as benzoin derivatives. The effectiveness of degassing is directly related to low melt viscosity and polydispersity of the polymer. While not wishing to be bound by any theory, it is believed that the low melt viscosity of the polymers results in the formation of capillaries through which entrapped gases can escape. Preferably, the polydispersity (Mw/Mn) of the polymer should approach unity to retain such a low melt viscosity. Another possible reason that such polymers are effective is that, in the melt state, the degassing agent acts as a low viscosity fluid which uniformly wets out the other toner components such as resin and pigment, and disperses it by the mechanical action of mixing equipment, such as a single or twin screw extruder. A family of low molecular weight polypropylene polymers, when incorporated into a toner formulation as degassing agents, will help release entrapped gases during extrusion and fusion and thus produced uniform dispersions having improved toner properties.

In general, a toner has been produced by melting and mixing a colorant, a charge control agent, an offset preventing agent such as polypropylenes and thermoplastic resin, uniformly dispersing them in the thermoplastic resin to prepare a composition, grinding the composition and then classifying the ground product. Besides, in the grinding process, it is difficult to uniformly disperse solid fine particles such as the colorant, charge control agent and offset preventing agent in the thermoplastic resin. The unevenly dispersed state of the solid fine particles may decrease the image density. Also, the uneven dispersion of these solid fine particles in the grinding process adversely affects the flowability, triboelectrification properties and the like of the resulting toner to great extent and influences properties of the toner, such as developing characteristics and durability. Accordingly, in the grinding process, it is necessary to take good care to uniformly disperse these solid fine particles. In order to overcome these problems in the grinding process, processes of producing a toner by aggregation and coalescence processes or suspension polymerization have been proposed in recent years.

In one embodiment, the present invention is a process for preparing a toner, and more specifically a process for aggregation and coalescence, or suspension polymerization of toner particles. In another embodiment, the present invention is a process for the preparation of an in situ chemical toner. In the practice of the present invention, it preferable that the processes for preparing toners include aggregation and fusion or coalescence of latex, colorants, pigment particles, and additives such as polypropylenes. The processes of the present invention are desirably economical and allow for the in situ, chemical or direct preparation of toners using steps including an initial preaggregation, followed by a second aggregation to toner sized particles without the utilization of the conventional pulverization and/or classification methods. The resulting toners can be selected for conventional electrophotographic processes, including digital processes, and particularly color imaging and printing processes.

In practicing the suspension polymerization process of the present invention, preferably a polymerizable monomer; a colorant; a charge control agent; an offset preventing agent, such as the polypropylenes and derivatives thereof of the present invention; and a polymerization initiator are poured into water or an aqueous dispersion medium composed principally of water, which contains a dispersion stabilizer. The dispersion can be prepared by means of a mixing device capable of mixing with high shearing force to form fine droplets of the polymerizable monomer composition, and the droplets are then polymerized, thereby forming toner particles. In one embodiment of the present invention, the colorant, charge control agent, offset preventing agent, are added to monomers such as styrene, which is a low-viscosity liquid, to disperse them therein. The resulting toner has far better dispersion than toners prepared by means of a grinding process, in which such components are mechanically dispersed in the resin.

The use of a polyethylene and polypropylene wax blend of the present invention having relatively low melting points and of a binder resin having a high viscosity can widen the non-offset area, a desirable trait in a toner. The polyethylene wax preferably has a melting point of from about 90 to about 130° C. and the polypropylene wax preferably has a melting point of from about 80 to about 150° C. Oxidized polyethylene waxes also performed very well compared to conventional polyethylene waxes when mixed with polypropylene waxes of the present invention. The blend of metallocene based polypropylene such as the polypropylenes of the present invention with Ziegler Natta based polypropylenes such as conventional polypropylene can also result in improved toner properties.

Use of conventional polypropylenes, which are commonly used in toners, has not been well explored in coating applications, such as powder coating applications, because of the conventional polypropylenes' higher melting points. Typical thermoset powder coatings are commonly used in processes with temperatures only as high as 110° C., whereas thermoplastic can be used in processes having temperatures up to 140° C. during the extrusion process. Conventional polypropylenes melt in the range of 140-155° C., thus restricting their usage in powder coating application. Desirably, the isotactic polypropylene homopolymers and copolymers of the present invention have a melting range of from about 80° C. to about 120° C. and are useful for powder coating applications such as thermoset and thermoplastic powder coatings.

The polymers of the present invention can be useful as an external mold release agent. External mold release agents are materials used in processes for molding materials, primarily polymers but also other materials, such as fiberboard, to facilitate release of the material being molded from a mold. Such release agents are often applied directly to mold as a wipe or, more frequently, as a spray. The isotactic polypropylene homopolymers, isotactic polypropylene copolymers, isotactic polypropylene derivatives, can be used either alone or in mixtures for this application. One important advantage of the present invention over the conventional mold release agents is that both the backbone and the functionality of polymers can be selected to facilitate the release of the particular material being molded.

The polymers of the present invention can be used as an internal mold release agent in certain molding applications. An internal mold release agent is a material that is admixed with the material to be molded rather than being applied directly to the mold. Preferably, the internal mold release is chemically bonded to the material being molded. In the practice of the present invention, an internal mold release is an isotactic polypropylene derivative having active hydrogen groups, amines and esters.

One application of the internal mold release agents of the present invention is in a process for reaction injection molding. For example, an internal mold release agent of the present invention having an active hydrogen or isocyanate functionality can be admixed with a polyol or a polyamine and a polyisocyanate and then injected into a mold to form a polyurethane or a polyurea, wherein the mold release agent would improve the ability of the resulting polymer to be removed from the mold.

The polymers of the present invention can also be used as compatibilizers. This is especially true of those functional derivatives describe herein. A polymer selected from the group consisting of an isotactic polypropylene homopolymer, an isotactic polypropylene copolymer, an isotactic homopolymer derivative, an isotactic copolymer derivative, and a polypropylene polyfunctional polymer of the present invention or mixtures thereof can be used to compatibilize two materials which would otherwise be incompatible. For example, the comparatively non-polar backbone of a polymer of the present invention can be prepared with a polar functional group to compatibilize a polar material and a non-polar material Another preferred use of the polymers of the present invention is as a processing aid for polymers. In preparing articles from polymers, it is often preferable that the articles being prepared have no voids, gels or other defects. For example, one common use of polymers is making films by a blow molding process. In this process, a film is formed by blowing a gas into a mass of molten polymer forming a tube that, after the polymer cools, is deflated and sliced into sheets. If there are voids due to the polymer forming gels or not smoothly flowing into an extruder, then the tube of molten polymer can either not form at all or deflate prematurely causing waste and down time, both possibilities being undesirable in industrial applications.

The processing aids of the present invention can be select and prepared to facilitate polymer processing. Preferably, the processing aid is a polymer selected from the group consisting of an isotactic polypropylene homopolymer, an isotactic polypropylene copolymer, an isotactic polypropylene derivative, and mixtures thereof. The molecular weights and functionality of the polymer can be selected such that the polymer promotes the void, gel, and defect free production of a plastic article.

Similar to their use as a processing aid in polymers, the polymers of the present invention can be used as an anti-blocking agent. Powders, including polymer powders, can be difficult to process if they have a tendency to stick together and form agglomerations rather than flow fluidly. Equipment to reduce and unblock powders such as conveyors, blowers, vibrators, thumpers, extruders and the like are expensive and can be maintenance intensive and as such, can be undesirable in industrial applications. The anti-blocking agents of the present invention are selected from the group consisting of an isotactic polypropylene homopolymer, an isotactic polypropylene copolymer, an isotactic polypropylene derivative, and mixtures thereof wherein the anti-blocking agent promotes the free flow of powders.

Other uses for the polymers of the present invention include using isotactic polypropylene homopolymers of the present invention as lubricants for poly vinyl chloride (PVC) and chlorinated PVC (CPVC); use as a monomer for polyalphaolefin polymerizations yielding an additive that allows polypropylene having better compatibility for fiberglass; UV light cured acrylate slip and anti-block materials; polyurethane foam mold release agents; polypropylene flow modifiers; nucleating agents for preparing polyethylene foams; additives to improve polypropylene and thermoplastic olefin polymer paintability, and the like.

Uses for the isotactic polypropylene homopolymer saturated derivatives of the present invention include expandable polystyrene (EPS) cell nucleation agents; EPS bead coating; polyurethane mold release agents; expandable pellet cell nucleation agents; cell control agents in extruded polystyrene foams; slip and anti-block agents for use with low density polyethylene, linear low density polyethylene, and high density polyethylene polymers, polypropylene flow modifiers; and as nucleating agents for polyethylene foams.

The isotactic polypropylene copolymers of the present invention have uses which can vary with type and amount of copolymer used to prepare the copolymers, but, generally, can be used as: a polypropylene flow modifier when prepared with alpha-olefins; a crosslinking agent for polystyrene when prepared with hindered dienes; an external mold release agent for engineering resins when prepared with allyl trimethylsilanes; a polypropylene compatibilizer when prepared with allyl benzene; and the like.

Exemplary derivatives and their uses include polymers of the present invention with: terminal epoxides which can be used as glass re-enforcement sizings and intermediates for stabilizers as well as paintability enhancing agents in polypropylene and thermoplastic olefin polymers and the like; and terminal alcohols which can be used as pigment dispersants, intermediates for stabilizers, polypropylene rotomolding, intermediates for stabilizers, polypropylene and thermoplastic polyolefin paintability enhancers, and the like. One family of derivates is useful as fiberglass reinforcement sizings. These derivatives include polymers of the present invention having a terminal trifluoroacetate group or a terminal maleic anhydride group. Also useful in the same application are the potassium salt, half ester and methyl quaternary salt of a maleic anhydride polymer of the present invention.

One use of a derivative of the present invention is as a compatibilizer and melt fracture reduction agent. Derivatives prepared by admixing a first derivative of the present invention having a primary hydroxyl are admixed with an alkylene oxide, preferably propylene oxide or ethylene oxide, and most preferably ethylene oxide in the presence of a base to form an ethoxylated alcohol. Such materials can act as a compatibilizer in polypropylene fiber production, and as a melt fracture reduction agent, particularly in the production of linear low-density polyethylene.

The polypropylene polyfunctional isotactic polypropylene derivatives of the present invention have many applications. For example, the polymers of the present invention having more than one hydroxyl group can be used as polyurethane cross linkers, polyurethane chain extenders, polyurethane foam cell opening agents, rocket motor binders, polyurethane polyols, telephone cable joint potting agents, polypropylene and thermoplastic polyolefin painting enhancing agents, electrical potting agents, encapsulation agents, components in waterproof membranes, and the like. Polymers of the present invention having multi-maleic anhydride groups are particularly useful as fiberglass reinforcement sizings.

The isotactic polypropylene copolymers of the present invention have uses which can vary with type and amount of copolymer used to prepare the copolymers, but, generally, can be used as: a polypropylene flow modifier when prepared with alpha-olefins; a crosslinking agent for polystyrene when prepared with hindered dienes; an external mold release agent for engineering resins when prepared with allyl trimethylsilanes; a polypropylene compatibilizer when prepared with allyl benzene; and the like.

The reactive end-groups of the vinyl, alcohol, acid, aldehyde, and epoxide allow, through their related family chemistries, the addition of an isotactic polypropylene molecule to such commonly known additives, as antioxidants, light stabilizers, acid scavengers, lubricants, processing aids, antifogging additives, anti-microbials, flame retardants, chemical blowing agents, crosslinking agents, and the like. The polypropylene portion of the resultant additive can increase or decrease the compatibility in the plastic intended to be modified and thereby modify the degree of dispersion, the migration rates, or the chemical reactivity in such a way as to improve the performance of the modified additive.

The reactive end-groups of the vinyl, alcohol, acid, and epoxide can participate in the termination of growing polymer chains and thereby adding a polypropylene tail to the polymer chain to improve internal and external lubricity, to modify the surface characteristics, or compatibilize the polymer for making composite blends. An example would be to improve the slip and antibocking characteristics of UV cure acrylates.

The isotactic polypropylene homopolymers and copolymers are excellent internal lubricants for PVC and CPVC to allow processing these materials safely in high shear extrusion and injection molding. Additionally, and because of their incompatibility in all high molecular weight polyethylenes, they would migrate to the surface of an extruded or injection molded part during processing where they would provide improved slip and anti-blocking because of their waxy and self lubricating nature. Also, these materials are excellent components of water based or solvent based dispersions for providing good spray-on mold release for polyurethane foam molding. Because of their almost complete compatibility in high molecular weight polypropylene, these materials will improve the flow characteristics of same, at low concentrations, allowing for faster mold filling, lower processing power consumption, and faster cycle times. These materials, because of their incompatibility in and higher melt point of polystyrene, are good cell nucleating agents for expandable polystyrene. In powder form or dispersed in water, they will provide excellent bead coating agents for expandable polystyrene.

As shown by example herein, anionic dispersions of a maleic anhydride containing polypropylene derivative of the present invention, when added to paint, substantially improve the ability of the paint to adhere to polypropylene containing plastics when neat or present as plastic blends. The silane containing polypropylene derivatives described herein can function as excellent flow lubricants and mold release agents for engineering resins such as acrylonitrile-butadiene-styrene, polycarbonate, and other more temperature resistant plastics.

The terminal epoxide polypropylene derivative described herein is able to react directly with fiberglass to create a glass reinforcement for polypropylene that is compatible with the matrix. This approach to creating a compatible glass eliminates the complicated step of first reacting the glass with an amino silane which is then reacted with a maleated polypropylene in a second step to create the reinforcement.

Improving the paintability of polypropylene containing plastics, i.e. thermoplastic polyolefins (TPOs), is desirable for automotive interior and exterior parts, because of the difficulty of getting adhesion to the plastic of typical paint systems. The addition of a water-based dispersion of maleic anhydride containing polypropylenes of the present invention to an acrylic latex paint substantially improves the paint adhesion to TPOs. Another approach is to compound the same polypropylene derivative into the TPO to be painted, whereby it will migrate to the surface to improve paint adhesion. It is easily projected that a combination of the methods would make the adhesion even better than one alone. Paint systems using epoxy and urethane chemistries may be similarly improved using the epoxide/hydroxy and hydroxy, respective containing polypropylenes.

Due to the hygroscopic nature of the ethoxylated alcohols of the polypropylenes of the present invention, they can be compounded into high molecular weight polypropylenes and/or polyethylenes, where they will migrate to the surface of, for example, films or fibers to provide hydrophilic properties to products that are otherwise hydrophobic in nature. This would have applications in many products made for nonwoven polypropylene and polyethylene mats such as diapers and synthetic cloths. Film applications would include any that require a lower contact angle with water.

Ethoxylated alcohols of polyethylene have been shown to reduce melt fracture in polyolefins. While not wishing to be bound by any theory, it is believed that the polypropylene based ethoxylated alcohols of the present invention will migrate to the surface in polyolefins and lubricate the metal contact surfaces, extending to higher shear rates, the onset of melt fracture.

Primary alcohols of polyethylene are used as pigment dispersants in polyethylene whereby either the non-polar or polar end of the molecule associates itself with the pigment particle, is isolated by the waxy tail, and prevents re-agglomeration, and thus, improving color development. The isotactic polypropylene derivative alcohols of the present invention can do the same in polypropylene.

Because of their incompatibility in many thermoplastic elastomers (TPEs), low molecular weight polypropylenes can be compounded with TPEs and while the mixture is in the molten state, can migrate to the surface, providing a layer of waxy anti-blocking polypropylene. This internal approach to achieving anti-blocking can work in cases where the blocking nature of the base polymers is moderate to low. If blocking is severe at ambient temperatures, migration is often too slow to put an ample amount of agent on the surface. In these more severe cases, a topical coating of anti-blocking agent is required. The polypropylenes, copolymers, and related derivatives can be dispersed in water to form dispersions which can be sprayed onto pellets, added via the underwater cutting cooling systems, etc. to put an sufficient amount of agent to prevent blocking.

The products of the present invention, unless further reacted to form a functional derivative, contain a normal alpha olefin. As such, the polypropylene homopolymers and copolymers described herein can also undergo polymerization using free radical initiators. As such they can be used either as the only raw material in such a polymerization, or they can be used as a comonomer in a polymerization. The products of this polymerization are unique due to their toughness and translucency. Such polymers or copolymers with are useful in candles as oil binders or as hardeners in lipsticks.

The products of the present invention, when subdivided to particle sizes of <500 microns can act as an abrasive in facial and body scrubs. Also when the products of this invention are subdivided to particle sizes having a diameter of less than 100 microns ($1 \times 10^{-6}$ m), they are useful as the binder in powdered eye, facial and body makeup, due to their ability to cold flow under pressure (pressure fix) and their excellent transparency. Because of their translucency and oil binding characteristics, the products of the present invention are useful as additives in such cosmetic products as lipsticks and sunscreens.

The following examples are provided to illustrate the present invention. The examples are not intended to limit the scope of the present invention and they should not be so interpreted. Amounts are in weight parts or weight percentages unless otherwise indicated.

EXAMPLE 1

An inert 100-liter reactor is charged with 45 kg of toluene and 400 ml aluminoxane (10% aluminum) is added. The reactor is heated to 68° C. and pressurized to 6 bar (600 kPa) with propylene. 150 mg of a bridged indenyl-cyclopentadienyl zirconocene catalyst precursor is dissolved in 600 ml of aluminoxane. The polymerization is initiated by the addition of the catalyst solution to the reactor. The temperature and pressure are held constant. Propylene is added as needed. After 2.2 hours the reaction is quenched by the addition of isopropanol. The solvent is removed under vacuum and the product drained as a melt. The product weight is 17.3 kg. GPC measurements indicate an Mn of 1649 and a PDI of 1.52. The properties are summarized in Table 1.

EXAMPLE 2

A polymer is prepared substantially identically to Example 1 except that 50 mg of catalyst dissolved in 400 ml of aluminoxane is used at 51° C. and 6.7 bar (670 kPa) of propylene pressure for 2 hours. The product weight is 18.4 kg. The properties are summarized in Table 1.

EXAMPLE 3

An inert 100-liter reactor is charged with 45 kg of toluene, 3 kg of 1-hexene and 400 ml aluminoxane (10% aluminum) is added. The reactor is heated to 53° C. and pressurized to 6 bar with propylene. 126 mg of a bridged indenyl-cyclopentadienyl zirconocene catalyst precursor is dissolved in 400 ml of aluminoxane. The polymerization is initiated by the addition of the catalyst solution to the reactor. The temperature and pressure are held constant. Propylene is added as needed. One additional kg of 1-hexene is added halfway through the reaction. After 3.5 hours the reaction is quenched by the addition of isopropanol. The solvent is removed under vacuum and the product drained as a melt. The product weight is 20 kg. The results are shown in Table 1.

EXAMPLE 4

A polymer is prepared substantially identically to Example 1 except that 100 mg of catalyst is used at 70° C. and 6.7 bar (670 kPa) of propylene pressure for 2.5 hours. The product weight is 18.8 kg. The properties are summarized in Table 1.

EXAMPLE 5

A polymer is prepared substantially identically to Example 3 except that 150 mg of catalyst is used at 51° C. and 6.9 bar (690 kPa) of propylene pressure for 3 hours and 1-octene is used in place of 1-hexene. The product weight is 21.2 kg. The properties are summarized in Table 1.

EXAMPLE 6

A polymer is prepared substantially identically to Example 1 except that 100 mg of catalyst is used at 75° C. and 6.6 bar of propylene pressure for 3.5 hours. The product weight is 17.3 kg. The properties are summarized in Table 1.

EXAMPLE 7

A polymer is prepared substantially identically to Example 1 except that 270 mg of catalyst is used at 71° C. and 6.5 bar of propylene pressure for 2.5 hours. The product weight is 29.5 kg. The properties are summarized in Table 1.

TABLE 1

| Ex. # | % Isotactic pentads | Mn (GPC) | PDI | DSC (° C.) | Pen 25° C. | Pen 140° F. | Vis (149° C.) | Flash (° C.) | Solid point (° C.) |
|---|---|---|---|---|---|---|---|---|---|
| 1 | ND | 1649 | 1.52 | 124.9 | 3 | 15.5 | 40 | 243 | 88 |
| 2 | ND | 2806 | 1.58 | 134.7 | 0.5 | 4 | 220 | 246 | 102 |
| 3 | ND | 3259 | 1.82 | 94.4 | 3 | 25 | 135 | 274 | 77 |
| 4 | 73.7 | 1503 | 1.84 | 121.5 | 1.5 | 10 | ND | 135 | 92 |
| 5 | ND | 3480 | 1.51 | 104.9 | 1.5 | 16 | 98 | 310 | 86 |
| 6 | 71.8 | 1879 | 2.00 | 124.9 | 5.5 | 29 | 20 | 213 | 82 |
| 7 | 86.3 | 1498 | 1.50 | 145.5 | 1 | ND | 70 | 232 | ND |

EXAMPLE 8

Maleic derivatives are prepared by 1:1 (MA-iPP) grafting. 1000 g (about 0.5 mol) of isotactic polypropylene homopolymer is placed in a reaction kettle with an agitator, an addition funnel and a nitrogen inlet. The temperature is maintained at 150° C. 49 g (0.5 mol) of maleic anhydride is dissolved in 60 ml of acetone and transferred to the addition funnel. Maleic anhydride solution is added dropwise to the reaction mass for 4 hours. The reaction kettle is then maintained at 150° C. for an additional 2 hours. The maleic grafted product is obtained after removing solvent.

EXAMPLE 9

Maleic derivatives are prepared by 2:1 (MA-iPP) grafting. A 2:1 maleic derivative is prepared and recovered substantially identically to Example 8 except that 98 g (1 mol) of maleic anhydride is used and the maleic anhydride solution is added dropwise to the reaction mass for 8 hours.

EXAMPLE 10

A maleated polypropylene wax is used to improve paint adhesion on TPOs. The maleated PP wax of Example 9 is utilized in making an anionic dispersion based on the formula shown below.

| | |
|---|---|
| Maleated PP of Ex. 9 | 23.6% |
| Diethylaminoethanol | 2.8% |
| Oleic Acid | 2.8% |
| DI Water | 70.8% |

The dispersion is prepared as follows. The ingredients are placed in a Parr reactor which is heated to 146° C. and stirred at 500 rpm for 30 minutes. The heat is shut off and the agitation is continued at 500 rpm until the contents cooled to below 40C. This dispersion (herein referred to as LX-1447) is tested for ability to adhere to thermoplastic polyolefins, (Basell Cataloy KS357P). To evaluate paint adhesion, the TPO is extruded into tapes approximately 1.5 inches (3.8 cm) wide and about 40 to 50 mils (1.0-1.2 mm) thick. The tape was then cut into approximately 3 inch (7.62 cm) lengths that are dipped into the coatings tested. After the tapes are allowed to dry or oven conditioned, the paint adhesion is determined by scribing a lattice pattern with a razor blade, through the paint surface, containing approximately 36 squares approximately ⅛ inch (0.32 cm) in size. SCOTCH® brand adhesive tape is then pressed onto the lattice pattern and pulled off to determine the % of squares removed. The paint used for the testing is a Monarch exterior grade acrylic latex paint (Monarch 2200, Aqua-Gleem 100% acrylic from Monarch Paint Company 3530 Lang Rd., Houston Tex. 77092). The following results are obtained with various coatings and oven conditioning after coating and are displayed in Table 2.

TABLE 2

| COATING | Oven Conditioning | % Squares Removed |
|---|---|---|
| Monarch Paint 100% | None | 70 |
| Monarch Paint 100% | 30 min. @ 121° C. | 93 |
| LX-1447 Only | None | 0 |
| 50% LX-1447/50% Monarch | None | 100 |
| 50% LX-1447/50% Monarch | 30 min. @ 121° C. | 0 |
| 20% LX-1447/80% Monarch | 30 min. @ 121° C. | 0 |
| 50% LX-1447/50% Monarch | 30 min. @ 80° C. | 0 |
| 20% LX-1447/80% Monarch | 30 min. @ 80° C. | 0 |
| 50% LX-1447/50% Monarch | 30 min. @ 121° C. then immersed 1 hr in gasoline | 0 |
| 20% LX-1447/80% Monarch | 30 min. @ 121° C. then immersed 1 hr in gasoline | 14 |
| 50% LX-1447/50% Monarch | 30 min. @ 121° C. then sprayed with OFF ® brand insect repellant | 0 |
| 20% LX-1447/80% Monarch | 30 min. @ 121° C. then sprayed with OFF ® brand insect repellant | 0 |

COMPARATIVE EXAMPLE 11

In a comparative study, EPOLENE E-43, which is a maleated polypropylene available from Eastman Kodak Chemicals Products, Inc., is used to prepare a dispersion using a formulation and procedure substantially identical to Example 10 except that the EPOLENE E-43 was used in place of the polymer of the present invention. This Comparative Example did not yield a stable dispersion because the components separated in about 12 hours at ambient conditions.

EXAMPLE 12

The toners used in the examples are produced through the dry melt technique commonly found throughout the toner industry. The first step consists of the master batch process where the ingredients are measured prior to mixing. The formulations consist of styrene acrylic resin, carbon black, charge control agent and either Sanyo 550P, a commercially available polypropylene commonly used in toners, or the product of Example 2. After pre-weighing, the material is dumped into a HENSCHEL-mixer®. The mixing method consisted of 12 seconds on low speed, followed by 5 minutes of intensive mixing on high speed. The mixed product then went on to be compounded using a twin-screw 30 mm co-rotating extruder. The melt temperatures are set to 85-95° C. with a screw rpm of 250. The molten material is then cooled through chill rollers and pelletized for collection. The next step of production involves rough grinding the material using a THOMAS WILEY grinder to 500 µm. The ground material is then milled to approximately 10 µm using a TROST mill. As an after-treatment or external treatment, silica is added at a weighed percentage of 0.2%. Again, the product is intensively mixed using a HENSCHEI mixer. The mixing method consisted of 10 seconds on low speed, 2 minutes on high speed. Lastly, the material is screened using 100-mesh screen. This left finished material that could now be evaluated in the copy machine.

The two formulations are designated as SL-012/97A & SL-012/97B. Both formulas consist of exactly the same percentages of other ingredients, with the difference being the type of wax. 97A utilized Sanyo 550P wax as stated above, with 97B utilizing the product of Example 2. No issues of compatibility are noted during pre-mixing or compounding of material. Both products show similar hardness during the rough grinding stages. The milling results in similar efficiency, with a slight edge to the 97B based on smaller particle size of the finished product from the same mill settings. However, flow rate as visually observed during the screening process yielded lower flow for 97B based on material remaining on the screen.

The application of the toner involved a mid-speed copier, specifically a MINOLTA® EP-5000 analog copier. Toner as originally supplied with the analog copier is initially run in the machine to form a baseline for image density, consumption and transfer efficiency. Once the baseline is established, the 97A toner is added to the developing unit's subhopper after removal of the OEM toner. The copier is then put through a 1K changeover, which consisted of 100 copies using a 25% chart and 900 copies using a 5% chart. The changeover period of 1K should be adequate to create a developer that contained a majority of the new toner while hindering any detrimental influence caused by a high percentage of fine material as a result of non-classification during the milling process. All parameters tested demonstrate similar readings for image density, consumption and transfer efficiency when using 97A material. 97B material showed a slight increase in consumption, increase in transfer efficiency with a slight corresponding increase in image density. The solid black showed no hot offset issues under normal machine conditions of 93.3° C. (200° F.)

Consumption is determined by weighing the developer unit before and after printing a specific number of test pages. Transfer efficiency is determined by weighing the waste collected after printing a specific number of test pages and comparing that weight to the amount of toner taken from the developer unit. Hardness is determined by examining the amount of build-up inside the grinder—harder materials give lower build-ups. Image density is determined by comparison with reference plates using a MACBETH RD 918 densitometer.

The results of the testing are shown in Table 3 below:

TABLE 3

| Toner | Hardness | Image Density | Consumption | Transfer Efficiency |
|---|---|---|---|---|
| OEM | Not Tested | ○ | ○ | ○ |
| 97A | ○ | ○ | ○ | ○ |
| 97B | B | ○ | ○ | B |

X: Worse than average
○: Average
B: Better than average

Some additional thermal properties of material utilized in the experiment are displayed below in Table 4:

TABLE 4

| Material | Softening Temperature (° C.) | Melting Temperature (° C.) |
|---|---|---|
| Styrene Acrylic resin | 78.1 | 118.6 |
| Sanyo 550P | N/A | 139.7 |
| Example 2 | 124.1 | 132.7 |

The above values were gengerated through use of a capillary rheometer (SHIMADZU ® Flow Tester CFT-500D)

EXAMPLE 13

Isotactic polypropylene polymers of the present invention are tested for rheological properties and compared to conventional polymers. The materials used, the testing methodology and the results of the testing are displayed below in Table 5.

TABLE 5

|  |  | 100° C. | 105° C. | 110° C. | 120° C. | 130° C | 135° C. | 140° C. | 145° C. |
|---|---|---|---|---|---|---|---|---|---|
| Ex. 5 | A | 1.08E−04 | 1.62E−02 |  |  |  |  |  |  |
|  | B | 1.10E+00 | 1.65E+02 |  |  |  |  |  |  |
|  | C | 2.22E+05 | 1.49E+03 |  |  |  |  |  |  |
| Ex. 9 | A |  | 3.36E−03 | 1.29E−02 |  |  |  |  |  |
|  | B |  | 3.42E+01 | 1.32E+02 |  |  |  |  |  |
|  | C |  | 7.16E+03 | 1.86E+03 |  |  |  |  |  |
| Ex. 2 | A |  |  |  | 3.91E−04 | 1.77E−04 | 1.36E−02 | 7.20E−01 |  |
|  | B |  |  |  | 3.98E+00 | 1.80E+00 | 1.38E+02 | 7.34E+03 |  |
|  | C |  |  |  | 6.15E+04 | 1.36E+05 | 1.78E+03 | 3.34E+01 |  |
| Sanyo 550 | A |  |  |  |  |  | 3.04E−05 | 3.86E−03 | 1.62E−02 |
|  | B |  |  |  |  |  | 3.09E−01 | 3.93E+01 | 1.65E+02 |
|  | C |  |  |  |  |  | 7.92E+05 | 6.24E+03 | 1.49E+03 |

A = Flow Rate (cm$^3$/s); B = Shear Rate (s−1); C = Viscosity (Pa.s)

EXAMPLE 14

Epoxide derivatives of homo-polymer polypropylene are prepared. 1000 g (about 0.5 mol) of isotactic polypropylene homo-polymer is placed in a suspension of 2000 ml of toluene in a spherical reaction flash reactor with an agitator, a condenser and a bottom outlet. The temperature is maintained at 60° C. 4.6 g (0.1 mol) of formic acid is added to the suspension and stirred for 15 minutes. 68 g (1 mol) of 50% aqueous hydrogen peroxide solution is slowly added to the mixture and stirred for 5 hours. The epoxide product is obtained after washing with water and removing solvent.

EXAMPLE 15

Epoxide derivatives of co-polymer polypropylene are prepared. 1000 g (about 0.3 mol) of isotactic propylene-hexene co-polymer is placed in a suspension of 2000 ml of toluene in a spherical reaction flash reactor with an agitator, a condenser and a bottom outlet. The temperature is maintained at 60° C. 2.76 g (0.06 mol) of formic acid is added to the suspension and stirred for 15 minutes. 40.8 g (0.6 mol) of 50% aqueous hydrogen peroxide solution is slowly added to the mixture and stirred for 5 hours. The epoxide product is obtained after washing with water and removing solvent.

EXAMPLE 16

Aldehyde derivatives are prepared from the isotactic polypropylene derivative of Example 14. 1000 g (about 0.5 mol) of an epoxide of isotactic polypropylene homopolymer is dissolved 2000 ml of toluene in a spherical reaction flash with an agitator, a condenser and a bottom outlet. Temperature is maintained at 100° C. 4 g (0.0125 mol) of zinc iodide is added to the solution and stirred for 2 hours. The aldehyde product is obtained after washing with 0.1 N hydrochloric acid, water and removing solvent.

EXAMPLE 17

Aldehyde derivatives are prepared from the isotactic polypropylene derivative of Example 15. 1000 g (about 0.3 mol) of epoxide of isotactic propylene-hexene co-polymer is dissolved 2000 ml of toluene in a spherical reaction flash reactor with an agitator, a condenser and a bottom outlet. The temperature is maintained at 100° C. 2.4 g (0.0075 mol) of zinc iodide is added to the solution and stirred for 2 hours. The aldehyde product is obtained after washing with 0.1 N hydrochloric acid, water and removing solvent.

EXAMPLE 18

Alcohol derivatives are prepared from the isotactic polypropylene derivative of Example 16. 1000 g (about 0.5 mol) of aldehyde of isotactic polypropylene homo-polymer is placed in a suspension of 2000 ml of toluene in a spherical reaction flash with an agitator, a condenser and a bottom outlet. The temperature is maintained at 60° C. 10 g (0.25 mol) of sodium borohydride and 50 ml of isopropanol were added to the suspension and stirred for 10 hours. The alcohol product is obtained after washing with water and removing solvent.

EXAMPLE 19

Alcohol derivatives are prepared from the isotactic polypropylene derivative of Example 17. 1000 g (about 0.3 mol) of aldehyde of isotactic propylene-hexene co-polymer is placed in a suspension of 2000 ml of toluene in a spherical reaction flash with an agitator, a condenser and a bottom outlet. The temperature is maintained at 60° C. 6 g (0.15 mol) of sodium borohydride and 50 ml of isopropanol were added to the suspension and stirred for 10 hours. The alcohol product is obtained after washing with water and removing solvent.

EXAMPLE 20

A copolymer is prepared using allyltrimethylsilane as a comonomer. An inert 1-liter reactor is charged with 600 ml of toluene and 20 ml allyltrimethylsilane are added. The reactor is heated to 80° C. and pressurized to 5 bar (500 kPa) with propylene. 2.5 mg of a bridged indenyl-cyclopentadienyl zirconocene catalyst precursor is dissolved in 6 ml of aluminoxane (10% aluminum). The polymerization is initiated by the addition of the catalyst solution to the reactor. The temperature and pressure are held constant. Propylene is added as needed. After 25 minutes, the reaction is quenched by the addition of isopropanol. The solvent and residual allyltrimethylsilane are removed under vacuum. 45 g of product is recovered. NMR analysis indicated Mn=1500, 70% isotacticity, and 5 mole % incorporated silane.

EXAMPLE 21

A silane group is added to the olefinic end of a polypropylene molecule of the present invention. Two grams of isotactic polypropylene (Mn=855) are dissolved in 5 ml of toluene. Two grams of either triethylsilane or triphenylsilane are added. To each of these is added 0.5 g of Karstedts catalyst. The mixture is heated at 105-110° C. for 6 hours. 13C NMR analysis indicates consumption of the terminal olefinic bonds.

EXAMPLE 22

An ethoxylated derivative of an isotactic polypropylene of the present invention is prepared. 480 g of a terminal alcohol of isotactic polypropylene with Mn=1100 is dissolved in 1 liter of xylene and 2.5 g of KOH is added. A reactor is heated to 130° C. and stirred. Ethylene oxide is added to maintain pressure at 100 psig for 6 hours. The ethylene oxide is vented and the solvent removed under a nitrogen flush. 800 g of product is recovered. NMR analysis indicates that 40-weight % ethylene oxide is present in the product recovered.

EXAMPLE 23

A non-ionic dispersion of the product of example 22 is prepared.

| Dispersion Ingredients | |
|---|---|
| Product of Example 22 | 200 g |
| UNITHOX ® 750 Ethoxylate | 40 g |
| DI water | 560 g |

The materials are charged to a 2-liter Parr reactor, the reactor is sealed and heated to 140-150° C. The reactants are mixed for 1 hour at 500 rpm. The heat is shut off and agitation continued at 500 rpm as reactor contents cool to <40° C.

The contents are removed from the reactor; The product is smooth, even and viscous. The products are analyzed and results of the analysis are:

| | |
|---|---|
| Solids | 31% |
| pH | 11 |
| Viscosity | 700 cP |

Drawdowns made from the dispersion on untreated polypropylene film indicate that wetting does occur.

EXAMPLE 24

A product is prepared by polymerization of metallocene co-polymer and olefin. 300 g of metallocene propene-hexene co-polymer prepared according to Example 3 above, and 700 g of C-30+ olefin obtained from Chevron-Phillips are placed in a reaction kettle with an agitator and a nitrogen inlet. The temperature is maintained at 150° C. Three portions of di-t-butyl peroxide, 10 g each, are added to the molten mass at 2-hour intervals. Reaction is then tailed off for an additional 2 hours. A product is obtained after vacuum under nitrogen sparging for one hour. GPC data of the polymerized product follows the same pattern of peaks as poly-olefin, (which was prepared from only C-30+ olefin according the above procedure), with proportionally higher molecular weight peaks. This suggests that there is incorporation of propylene/hexene co-polymer onto the poly-olefin chains. An unexpected property of this polymerized product in that its visual appearance is glossier and less opaque than that of the conventional polyolefin.

What is claimed is:

1. A toner comprising a resin and a colorant, wherein the resin has lubricant properties and is prepared by admixing a thermoplastic resin having a primary, secondary or tertiary group reactive with active hydrogens with an isotactic polypropylene derivative having an active hydrogen group under reaction conditions sufficient to form a toner resin having lubricant properties wherein the isotactic polypropylene derivative is one comprising the reaction product of admixing:
(a) an isotactic polypropylene homopolymer prepared by a process including polymerizing propylene in the presence of a metallocene catalyst at a temperature of from about 30 to about 120 degrees centigrade under reaction conditions sufficient to polymerize propylene wherein the isotactic polypropylene has:
  (i) an isotactic index of from about 75 to about 85 percent isotactic pentads;
  (ii) a number average molecular weight of from about 1,000 to about 5,000 daltons;
  (iii) a weight average molecular weight of from about 2,000 to about 10,000 daltons; and
  (iv) a melting point range of from about 80 to about 120 degrees centigrade;
(b) an isotactic copolymer prepared by a process including polymerizing propylene and from 0.1 to 50 mole percent of at least one co-monomer in the presence of a metallocene catalyst at a temperature of from about 30 to about 120 degrees centigrade under reaction conditions sufficient to polymerize propylene wherein the isotactic copolymer has:
  (i) an isotactic index of from about 60 to about 95 percent isotactic pentads;
  (ii) a number average molecular weight of from about 300 to about 10,000 daltons;
  (iii) a weight average molecular weight of from about 600 to about 20,000 daltons; and (iv) a melting point range of from about 50 to about 120 degrees centigrade; or
(c) a mixture of (a) and (b);
with a derivatizing agent or a series of derivatizing agents under reaction conditions sufficient to add to the isotactic polypropylene homopolymer or isotactic polypropylene copolymer or mixtures thereof, a functional group selected from the group consisting of alcohol, ester, anhydride, carboxylic acid, amine, nitrile, imine, silane, siloxane, sulfonate, alkane, aldehyde, epoxide, organoborane, ethoxylate, propoxylate, higher alkoxylate, and halogen functional groups.

2. A toner comprising a resin, a colorant, and a lubricant wherein the lubricant is a composition comprising a polymer selected from the group consisting of:
(A) An isotactic polypropylene homopolymer comprising a homopolymer prepared by polymerizing propylene in the presence of a metallocene catalyst at a temperature of from about 30 to about 120 degrees centigrade under reaction conditions sufficient to polymerize propylene to produce a homopolymer having:
  (a) an isotacticity index of from about 60 to about 95% isotactic pentads;
  (b) a number average molecular weight of from about 300 to about 10,000 daltons;
  (C) a weight average molecular weight of from about 600 to about 20,000 daltons; and
  (d) a melting point range of from about 50 to about 120 degrees centigrade;
(B) An isotactic polypropylene copolymer comprising a copolymer prepared by polymerizing propylene monomer and at least one co-monomer in the presence of a metallocene catalyst at a temperature of from about 30 to about 120 degrees centigrade under reaction conditions sufficient to polymerize propylene to produce a copolymer having:
  (a) an isotacticity index of from about 60 to about 95 percent isotactic pentads;
  (b) a number average molecular weight of from about 300 to about 10,000 daltons;
  (c) a weight average molecular weight of from about 600 to about 20,000 daltons; and
  (d) a melting point range of from 50 to about 120 degrees centigrade;
wherein the mole rercent of propylene monomer to co-monomer is from about 0.1 to about 50;
(C) An isotactic polypropylene derivative comprising the reaction product of admixing:
  (a) an isotactic polypropylene homopolymer prepared by a process including polymerizing propylene in the presence of a metallocene catalyst at a temperature of from about 30 to about 120 degrees centigrade under reaction conditions sufficient to polymerize propylene;
  (b) an isotactic copolymer prepared by a process including polymerizing propylene and from 0.1 to 50 mole percent of at least one co-monomer in the presence of a metallocene catalyst at a temperature of from about 30 to about 120 degrees centigrade under reaction conditions sufficient to polymerize propylene; or
  (c) a mixture of (a) and (b);
with a derivatizing agent or a series of derivatizing agents under reaction conditions sufficient to add to the isotactic polypropylene homopolymer or isotactic polypropylene copolymer or mixtures thereof, a functional group selected from the group consisting of alcohol, ester, anhydride, carboxylic acid, amine, nitrile, imine, silane, siloxane, sulfonate, alkane, aldehyde, epoxide, organoborane, ethoxylate, propoxylate, higher alkoxylate, and halogen functional groups; and
(D) mixtures thereof;
wherein the resin is a toner binder resin comprising the reaction rroduct of an isotactic polypropylene derivative and a polyester or an isotactic polypropylene derivative and a styrene butadiene acrylate, and the isotactic polypropylene derivative comprises the reaction product of admixing:
  (a) an isotactic polypropylene homopolymer prepared by a process including polymerizing propylene in the presence of a metallocene catalyst at a temperature of from about 30 to about 120 degrees centigrade under reaction conditions sufficient to polymerize propylene;
  (b) an isotactic copolymer prepared by a process including polymerizing propylene and from 0.1 to 50 mole percent of at least one co-monomer in the presence of a metallocene catalyst at a temperature of from about 30 to about 120 degrees centigrade under reaction conditions sufficient to polymerize propylene; or
  (c) a mixture of (a) and (b);
with a derivatizing agent or a series of derivatizing agents under reaction conditions sufficient to add to the isotactic polypropylene homopolymer or isotactic polypropylene copolymer or mixtures thereof, a functional group selected from the group consisting of alcohol, ester, anhydride, carboxylic acid, amine, nitrile, imine, silane, siloxane, sulfonate, alkane, aldehyde, epoxide, alcohol, organoborane, ethoxylate, propoxylate, higher alkoxylate, and halogen functional groups.

3. The toner of claim 2 wherein the metallocene catalyst used to prepare the isotactic polypropylene homopolymer or isotactic polypropylene copolymer, or isotactic polypropylene derivative are bridged or unbridged.

4. The toner of claim 2 wherein the isotactic polypropylene homo polymer or isotactic polypropylene copolymer has:
  (a) an isotacticity index of from about 70 to about 90 percent isotactic pentads;
  (b) a number average molecular weight of from about 700 to about 8,000 daltons;
  (c) a weight average molecular weight of from about 1400 to about 16,000 daltons; and
  (d) a melting point range of from about 65 to about 120 degrees centigrade.

5. The toner of claim 4 wherein the isotactic polypropylene homo polymer or isotactic polypropylene copolymer has: (a) an isotacticity index of from about 75 to about 85 percent isotactic pentads;
  (b) a number average molecular weight of from about 1,000 to about 5,000 daltons;
  (c) a weight average molecular weight of from about 2,000 to about 10,000 daltons; and
  (d) a melting point range of from about 80 to about 120 degrees centigrade.

6. The toner of claim 2 wherein the colorant is selected from the group consisting of carbon black, nigrosine, aniline blue, charcoal blue, chromium yellow, ultramarine blue, DuPont oil red, quinoline yellow, methylene blue chloride, phthalocyanine blue, malachite green ocsalate, lamp black, rose bengal and mixtures thereof.

7. The toner of claim 2 additionally comprising a charge control agent and a magnetic powder.

8. The toner of claim 7 wherein the magnetic powder is selected from the group comprising ferrites, magnetite, iron, cobalt, nickel, and alloys thereof.

* * * * *